United States Patent
Khatri et al.

(10) Patent No.: US 7,496,742 B2
(45) Date of Patent: Feb. 24, 2009

(54) METHOD AND SYSTEM OF SUPPORTING MULTI-PLUGGING IN X8 AND X16 PCI EXPRESS SLOTS

(75) Inventors: Mukund Purshottam Khatri, Austin, TX (US); Anand Joshi, Round Rock, TX (US); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 459 days.

(21) Appl. No.: 11/348,651

(22) Filed: Feb. 7, 2006

(65) Prior Publication Data

US 2007/0186088 A1  Aug. 9, 2007

(51) Int. Cl.
- *G06F 9/00* (2006.01)
- *G06F 13/00* (2006.01)
- *G06F 13/40* (2006.01)
- *G06F 15/177* (2006.01)

(52) U.S. Cl. .............. 713/1; 713/2; 713/100; 710/8; 710/10; 710/104; 710/307

(58) Field of Classification Search ............ 713/1, 713/2, 100; 710/8, 10, 104, 1, 2, 100, 307
See application file for complete search history.

(56) References Cited

U.S. PATENT DOCUMENTS

| | | | |
|---|---|---|---|
| 5,790,815 A * | 8/1998 | Swanstrom et al. | 710/309 |
| 6,035,364 A * | 3/2000 | Lambrecht et al. | 710/305 |
| 7,099,969 B2 * | 8/2006 | McAfee et al. | 710/107 |
| 7,103,695 B2 * | 9/2006 | Peil et al. | 710/301 |
| 7,325,086 B2 * | 1/2008 | Kong et al. | 710/307 |
| 7,370,132 B1 * | 5/2008 | Huang et al. | 710/307 |
| 7,383,373 B1 * | 6/2008 | Strickland | 710/315 |
| 2005/0088445 A1 * | 4/2005 | Gonzalez et al. | 345/502 |
| 2005/0102454 A1 * | 5/2005 | McAfee et al. | 710/107 |
| 2005/0144488 A1 * | 6/2005 | Lee et al. | 713/300 |
| 2005/0235070 A1 * | 10/2005 | Young et al. | 710/8 |
| 2005/0240703 A1 * | 10/2005 | Nguyen et al. | 710/301 |
| 2006/0267988 A1 * | 11/2006 | Hussain et al. | 345/502 |
| 2007/0011383 A1 * | 1/2007 | Berke et al. | 710/301 |
| 2007/0180179 A1 * | 8/2007 | Irisa | 710/307 |
| 2007/0239925 A1 * | 10/2007 | Koishi | 710/316 |
| 2007/0276981 A1 * | 11/2007 | Atherton et al. | 710/307 |

OTHER PUBLICATIONS

Wheeler et al, Conversion of PCI-X ASIC to PCI Express 1.1, 2005, PCI-SIG.*
Jim Brewer and Joe Sekel, PCI Express Technology, Feb. 2004, 11 pages, Dell, Inc.

* cited by examiner

*Primary Examiner*—Mark Connolly
(74) *Attorney, Agent, or Firm*—Haynes and Boone, LLP

(57) ABSTRACT

A card having a first device and a second device is plugged into a root port having a predefined root port width. The first device is trained and the device lane width is determined. If the root port width is greater than the device lane width then the root port is dynamically configured via hardware strapping to include a predefined number of adjacent ports with each port having a lane width equal to the device lane width. The root port is reset to force training of the first device and the second device.

9 Claims, 4 Drawing Sheets

METHOD AND SYSTEM OF SUPPORTING MULTI-PLUGGING IN X8 AND X16 PCI EXPRESS SLOTS

BACKGROUND

The present disclosure relates to the field of communications, and more particularly to automatically detecting multiple electrical devices coupled to an information handling system.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, entertainment, and/or global communications. In addition, information handling systems may include a variety of hardware and software components that may be configured to process, store, and communicate information and may include one or more computer systems, data storage systems, and networking systems.

Many IHS's include a main printed circuit board (also referred to as a motherboard) in which several expansion connectors are coupled to a common communications bus, for example the Peripheral Component Interconnect (PCI) bus and the more recent PCI Express (PCIe) bus. Each expansion connector is capable of receiving an expansion card to provide additional capability to the system. Expansion cards may also be known as add-in-cards (AICs) or simply as cards.

In the PCIe architecture, a root port coupled to a processor/chip set may be coupled to one or more PCIe devices via a PCIe connector. An electrical connection between the root port and the device is a link and each link includes at least one lane (also referred to as channel) with each lane having a set of receiver/transmitter. The PCIe specification presently defines X1, X2, X4, X8, X12, X16, X32 and X64 link widths or lanes, although some of the link widths such as X32 and X64 may be presently unimplemented. The root port and the device negotiate a width of the link during the startup process. Specifically, a basic input output system (BIOS) program detects PCIe devices coupled to PCIe ports during a power on self test (POST) startup phase of the IHS.

Presently, if the width of the root port is greater than the width of the device plugged into the root port, then the unused portion of the width of the root port may not be utilized and thus wasted. That is, if an X4 lane device located on a card is plugged into a root port having X8 lanes, then only X4 lanes of the root port may be utilized. Another X4 lane device located on the same card plugged into the X8 lane root port, and capable of using the remaining X4 lanes, may not be detected and/or may not be trained as a part of the startup process.

Therefore, a need exists for utilizing available bandwidth of a PCIe root port. More specifically, a need exists to develop tools and techniques for detecting multiple independent devices located on a single card that is plugged into a PCIe compliant root port. Accordingly, it would be desirable to provide for detecting and training all devices located on a card plugged into PCIe compliant a root port included in an IHS, absent the disadvantages found in the prior methods discussed above.

SUMMARY

The foregoing need is addressed by the teachings of the present disclosure, which relates to training multiple devices located on a card. According to one embodiment, in a method and system for multi-plugging, a card having a first device and a second device is plugged into a root port having a predefined root port width. The first device is trained and the device lane width is determined. If the root port width is greater than the device lane width then the root port is dynamically configured via hardware strapping to include a predefined number of adjacent ports with each port having a lane width equal to the device lane width. The root port is reset to force training of the first device and the second device.

The improved method and system, which does not require any BIOS setup options to control, advantageously utilizes the available bandwidth of the PCIe root port by using the maximum lane width of the root port. The root port is dynamically and automatically configured to a predefined number of adjacent ports to communicate with a corresponding number of devices located on the card of the information handling system.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, if a lane width of a root port is greater than a lane width of a device plugged into the root port, then the unused portion of the lane width of the root port may be wasted. Thus, there is a need for an improved method and system to train multiple devices located on a card to effectively utilize the maximum width of the root port. According to one embodiment, in a method and system for multi-plugging, a card having a first device and a second device is plugged into a root port having a predefined root port width. The first device is trained and the device lane width is determined. If the root port width is greater than the device lane width then the root port is dynamically configured via hardware strapping to include a predefined number of adjacent ports with each port having a lane width equal to the device lane width. The root port is reset to force training of the first device and the second device.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to receive/transmit communications between the various hardware components.

Figure 1:
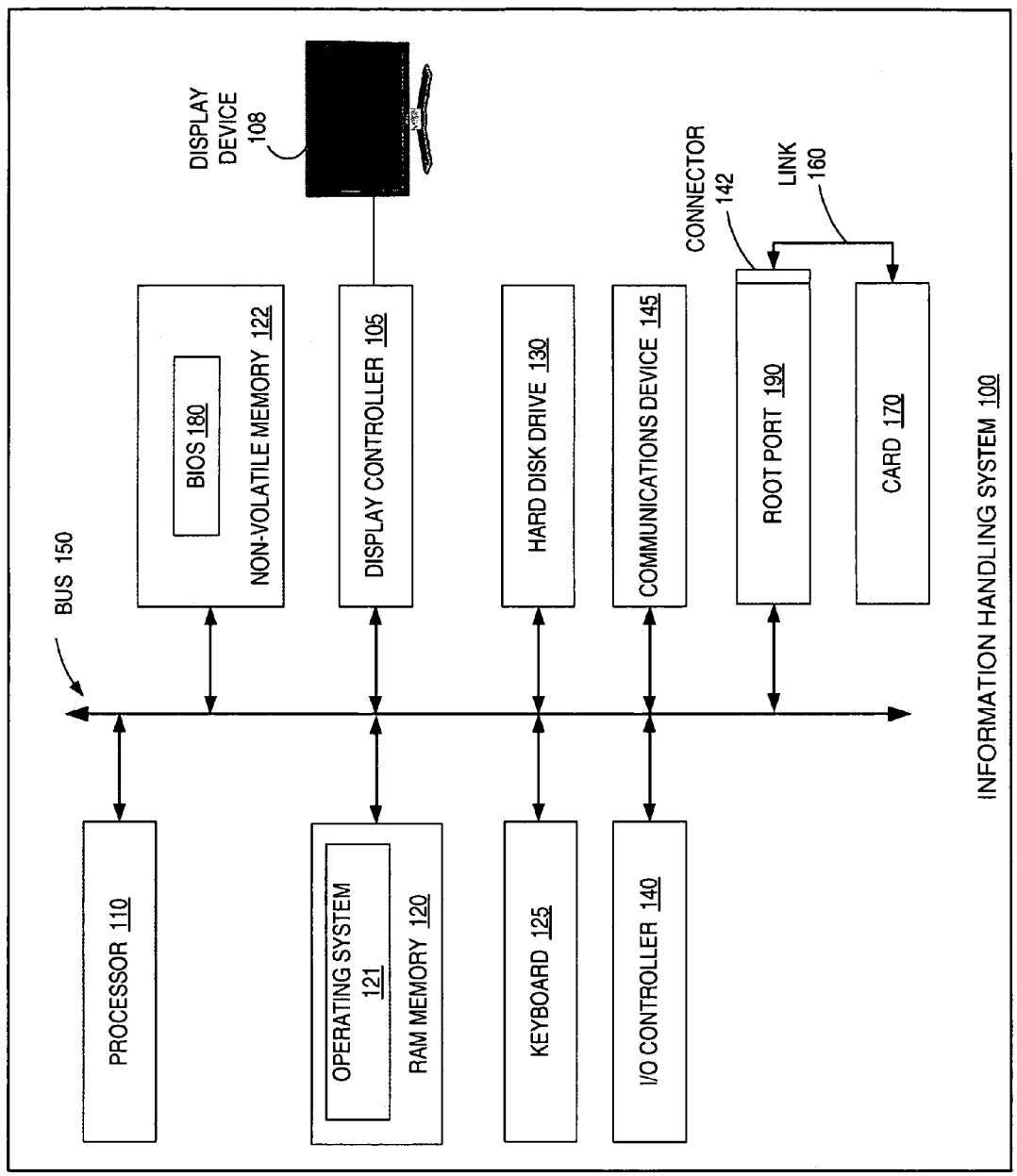
FIG. 1 illustrates a block diagram of an information handling system having multi-plugging, according to an embodiments.

FIG. 1 illustrates a block diagram of an information handling system 100 having multi-plugging, according to an embodiment. The information handling system 100 includes a processor 110, a system random access memory (RAM) 120 (also referred to as main memory), a non-volatile memory (NVM) 122 memory, a display controller 105 coupled to a display device 108, a keyboard 125 and an I/O controller 140 for controlling various other input/output devices. For example, the I/O controller 140 may include a keyboard controller, a cursor device controller and/or the serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. In an exemplary, non-depicted embodiment, not all devices shown may be directly coupled to the bus 150. The multiple instances of the bus 150 may be in compliance with one or more proprietary standards and/or one or more industry standards such as PCI, PCIe, ISA, USB, SMBus, and similar others. A communications device 145, such as a network interface card and/or a radio device, may be connected to the bus 150 to enable wired and/or wireless information exchange between the IHS 100 and other devices (not shown).

As described in the PCIe standard, a root complex port connects a processor and memory subsystem to a PCIe switch fabric comprised of one or more switch ports. The root complex port initializes and manages the PCIe fabric. The switch port routes data between multiple PCIe links including the legacy PCI bus. An endpoint of the PCIe fabric terminates the PCIe hierarchy. The root complex port, which may be simply referred to as a root port, may be implemented as a chipset, as a discreet device and/or may be integrated into the processor. The root port may include more than one PCIe port. That is, the root port may support more than one engine to communicate with each corresponding port. The number of engines supported by the root port may depend on a specific chipset deployed. For example, the root port for a particular chipset may include up to two engines, which may support up to two adjacent ports.

In the depicted embodiment, a root port 190 provides PCIe standard based communication between the IHS 100 and other PCIe compliant devices. In a particular embodiment, the I/O controller 140 and the PCIe root port 190 may be substantially similar. Upon insertion of a card 160 into a connector 142 electrically coupled to the root port 190, the PCIe root port 190 establishes communication with the card 170 via a link 160. The link 160 includes at least one lane. In a particular embodiment, the link 160 supports scalable widths such as in X1, X2, X4, X8, X12, X16, X32 and X64 lane configurations to match desired application performance and throughput. Additional detail of the PCIe root port 190 and the card 170 is described with reference to FIG. 2.

In a particular embodiment, a portion of the NVM 122 is used to stored a basic input output system (BIOS) 180. In a particular embodiment, the BIOS 180 includes instructions to control the operation of the PCIe root port 190. Additional detail of the BIOS 180 is described with reference to FIG. 3.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) 121 of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. The BIOS 180 is typically programmed in an assembly language. Software may also be implemented using C, XML, C++ objects, Java and Microsoft's .NET technology.

Figure 2:
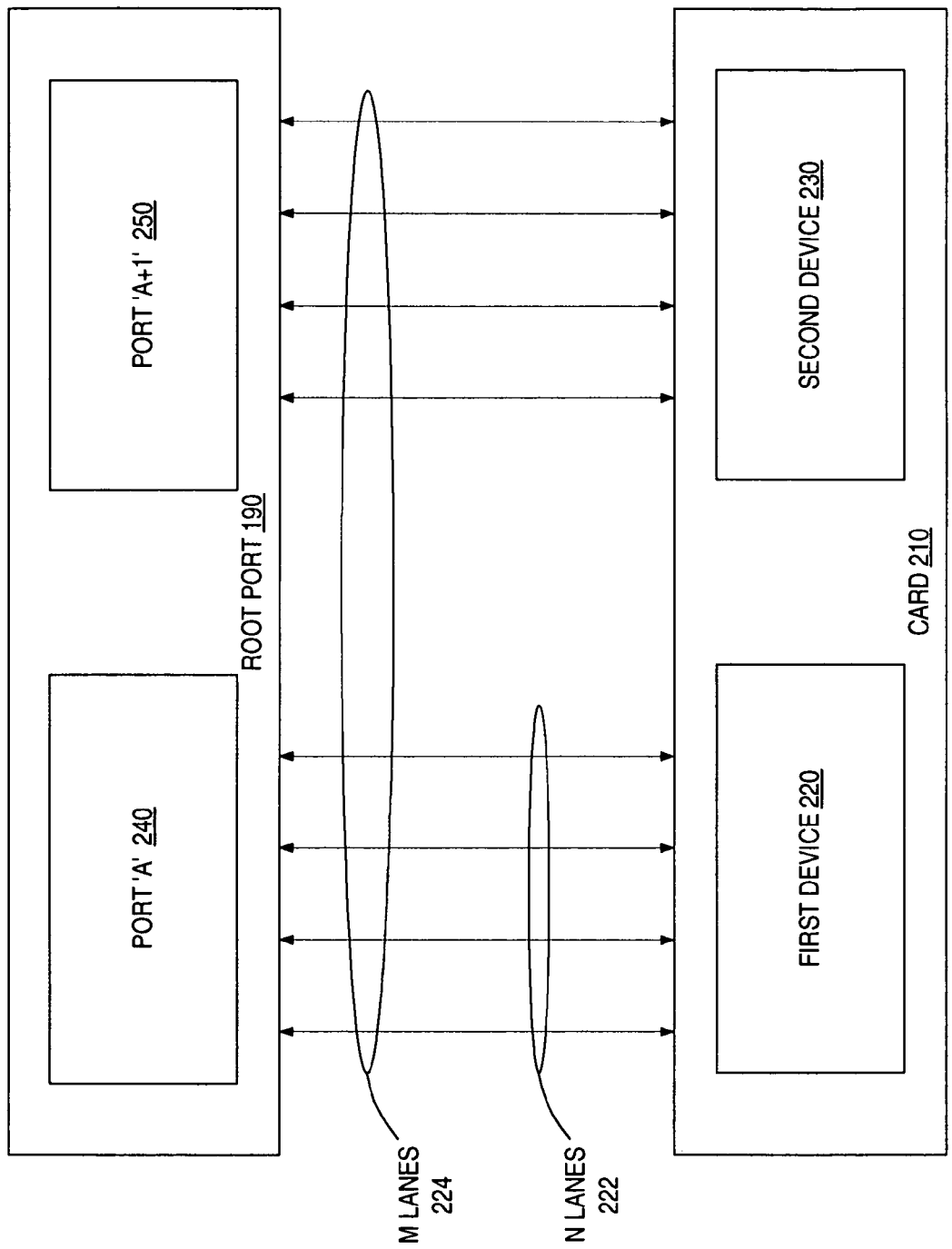
FIG. 2 illustrates a block diagram of a multi-plug card coupled to a root port, according to an embodiment.

FIG. 2 illustrates a block diagram of a multi-plug card coupled to a root port, according to an embodiment. In the depicted embodiment, a card 210 includes a first device 220 and a second device 230. The two devices 220 and 230 are different and independent. In a particular embodiment, the card 220 is substantially the same as the card 170 described with reference to FIG. 1. In a particular embodiment, the first device 220 is capable of communicating with the root port 190 via predefined number of lanes, such as N lanes 222, where N is an integer. In a particular embodiment, the root port 190, which supports multi-plugging, is capable of communicating with the card 210 via another predefined number of lanes, such as M lanes 224, where M is an integer and M is greater than or equal to N. In a particular embodiment, the value of M and N each may be expressed as a power of 2. In the depicted embodiment, the first device 220 is capable of communicating with the root port 190 via X4 lanes and the second device 230 is also capable of communicating with the root port 190 via X4 lanes, with the width of the root port 190 being configured as X8 lanes as a default upon initial power on. In this embodiment, M is equal to 8 and N is equal to 4.

In a particular embodiment, a number of engines supported by the root port 190 may be reconfigured, e.g., by a hardware strapping technique. That is, the root port 190 is dynamically reconfigurable into a predefined number of adjacent ports, e.g., port A 240 and port A+1 250 to communicate with the multiple devices such as the first and second devices 220 and 230 and thereby support multi-plugging. Additional detail of the dynamic configuration of the root port 190 in response to plugging in the card 210 is described with reference to FIG. 3. As described earlier, many root port chipsets may not have native support for multi-plugging. That is, the root port chipset may not natively know "how" to train not only the first device 220 but both the PCIe devices 220 and 230 when the strapping is set for maximum lanes (X8 lanes in this embodiment). The hardware strapping technique advantageously enables reconfiguration of the root port and detection and training of all multiple independent devices located on the card 210.

In a particular embodiment, the card 210 is a multi-plug card because it supports multiple devices (e.g., devices 220 and 230, as opposed to multiple functions) on a single card. As an example, a transmission control protocol (TCP) offload engine (TOE) network interface card (NIC) may be implemented as the card 210. The functionality of a TOE NIC card having two separate X4 devices on a single card coupled to an X8 capable PCIe slot is advantageous because the TOE NIC card provides improved fault tolerance compared to a dual function NIC implementation. Other types of multi-plug type cards such as networking, storage and graphics cards are also contemplated.

Figure 3:
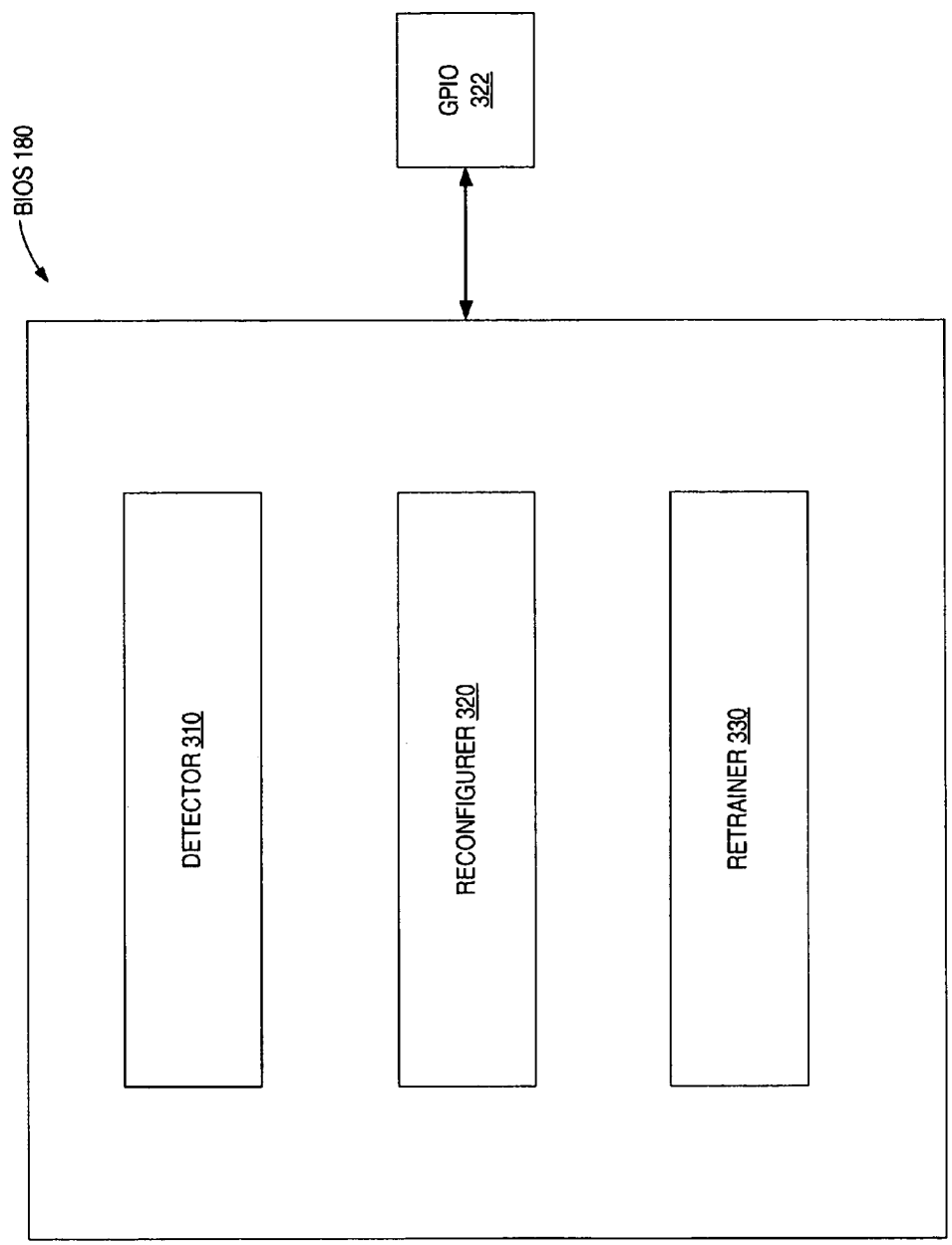
FIG. 3 is an illustrative block diagram structure of a basic input output system (BIOS) for dynamically configuring a root port, according to an embodiment.

FIG. 3 is an illustrative block diagram structure of a basic input output system (BIOS) for dynamically configuring a root port, according to an embodiment. Referring to FIGS. 2 and 3, during a startup phase of the IHS 100, e.g., upon initial power on condition or upon insertion of the card 210 into the root port 190, the BIOS 180 is executable to detect the card 210 and train one or more devices located on the card 210. In the depicted embodiment, the BIOS 180 includes a detector 310 module for detecting the first device 220 located on the card 210, a reconfigurer 320 module for dynamically (e.g., at run-time and during the startup phase) reconfiguring the configuration of the root port 190 and a retrainer 330 module for forcing a re-training of the card 210 to detect and train all multiple devices located on the card 210.

The detector 310 detects a presence of the card 210 inserted into the root port 190. As a part of the plug-and-play technology, link negotiations occur between the first device 220 of the card 210 and the root port 190. During the link negotiations, the detector 310 receives data from the first device 220 indicative of its lane width, e.g., N lanes 224. As a default, an initial configuration for the root port 190 is defined to have a single port having M lanes 224 as the lane width.

The reconfigurer 320 determines whether the widths of the first device 220 and the root port 190 match. That is, determine whether M is greater than N. If the widths match then the BIOS 180 may continue with the remainder of the POST. If M is greater than N, then additional unused lanes may exist on the root port 190 and/or there may be additional devices located on the card 210, which may have not been detected and trained. In order to detect and train previously undetected devices located on the card 210, the reconfigurer 320 reconfigures the root port 190 from the single port default configuration (having a single engine) to a predefined number of adjacent ports (having more than one engine). In a particular embodiment, the predefined number of adjacent ports is the same as the number of multiple devices located on the card 210. That is, the predefined number of adjacent ports is 2 because the card includes 2 devices. In this embodiment, the first adjacent port A 240 has an X4 lane width equal to N and the second adjacent port A+1 250 has an X4 lane width equal to N, where N is equal to M divided by 2. Devices having widths smaller than the width of the adjacent port may be detected and trained. In an exemplary non-depicted embodiment, the first adjacent port A 240 may be coupled to a device having X4 lanes and the second adjacent port A+1 250 may be coupled to another independent device located on the same card having X1 lane. In a particular embodiment, the first adjacent port A 240 has a width equal to N lanes (which is equal to the maximum lane width of the first device 220) and the second adjacent port A+1 250 has (M-N) lanes.

In a particular embodiment, the reconfigurer 320 write predefined data to a general purpose input output (GPIO) register 322. The predefined data controls a hardware strapping of the root port 190 to the predefined number of adjacent ports. Specifically, the predefined data changes the hardware strapping for the root port 190 from the default single port having M lanes 224 to the predefined number of adjacent ports having M lanes divided the predefined number per port.

In the depicted embodiment, the retrainer 330 module provides a reset command for forcing a re-training of the card 210. The reset command may be provided to the root port 190 or to reset the IHS 100 system. The reset action forces re-detection of and re-training for all multiple devices located on the card 210.

Figure 4:
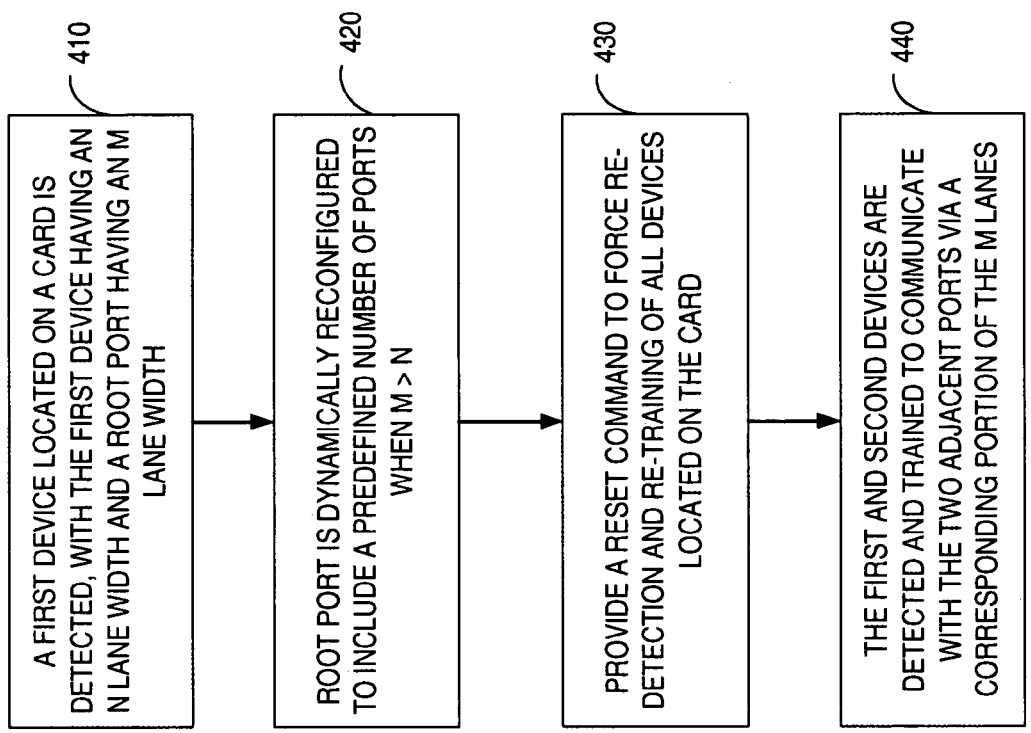
FIG. 4 is a flow chart illustrating a method for training devices included on a card plugged into a root port, according to an embodiment.

FIG. 4 is a flow chart illustrating a method for training devices included on a card plugged into a root port, according to an embodiment. In a particular embodiment, the card is the card 210 having the first and second devices 220 and 230 described with reference to FIG. 2 and the root port is the root port 190 described with reference to FIG. 1. In step 410, a first device located on the card is detected. The first device is configured to communicate via N lanes and the root port having a single port is configured to communicate via M lanes, where M and N are predefined integers. In step 420, the root port is dynamically reconfigured to include a predefined number of adjacent ports when M is greater than N. In step 430, a reset command is provided to force a re-detection and re-training of all the multiple devices located on the card. The reset command may be provided to the root port or may be provided as a system reset to reset the IHS 100. In step 440, the first device and the second device located on the card is detected and trained to communicate with one of the predefined number of adjacent ports via a corresponding portion of the M lanes.

Various steps described above may be added, omitted, combined, altered, or performed in different orders. In a particular embodiment, the steps 420, 430 and 440 may be omitted when M is not greater than N.

The illustrative embodiments advantageously provide an improved technique for detection and training of multiple independent devices located on a single card plugged into a PCIe compliant root port. The improved method and system does not require any BIOS setup options. The improved technique advantageously utilizes the available bandwidth of the PCIe root port by using the maximum lane width of the root port. The root port is dynamically and automatically configured to switch from a default configuration having a single port to a predefined number of adjacent ports, thereby being able to detect and train a corresponding number of devices located on the card of the information handling system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for training devices included on a card, the card being plugged into a root port, the method comprising:
   detecting a first device located on the card, wherein the first device is configured to communicate via N lanes and the root port is configured to communicate via M lanes, wherein M and N are predefined integers;
   configuring the root port to include a predefined number of adjacent ports when M is greater than N;
   providing a reset command to force a retraining of the devices; and
   detecting the first device and a second device located on the card, wherein the second device is independent of the first device, wherein each one of the first device and the second device is configured to communicate with one of the predefined number of adjacent ports via a corresponding portion of the M lanes.

2. The method of claim 1 further comprising:
   configuring the root port to include a single port if M is not greater than N.

3. The method of claim 1, wherein the configuring of the root port is a hardware strap operable to dynamically change the root port from a default value of a single port set at initial power on condition to the predefined number of adjacent ports.

4. An information handling system (IHS) comprising:
   a processor;
   a memory coupled to the processor via a bus;
   a root port coupled to the bus;
   a card plugged into the root port via a connector, wherein the root port is operable to communicate with the card via M lanes where M is an integer, wherein the card includes a first device and a second device, the second device being different than the first device; and
   a basic input output system (BIOS) stored in memory, wherein the BIOS includes instructions executable by the processor for:
      detecting the first device located on the card;
      configuring the root port to include a predefined number of adjacent ports if M is greater than N, wherein each one of the predefined number of adjacent ports is configured to communicate via a corresponding half of the M lanes;
      resetting the root port; and
      detecting the first device and the second device, wherein each one of the first device and the second device is configured to communicate with one of the predefined number of adjacent ports via the corresponding half of the M lanes.

5. The system of claim 4, wherein the card, the root port and the connector is in accordance with a peripheral component interconnect express (PCIe) standard.

6. The system of claim 4, wherein M is selectable to be one of 8 and 16, and N is correspondingly selectable to be one of 4 and 8.

7. The system of claim 4, wherein the BIOS forces the detecting of the second device by a reset.

8. The system of claim 4, wherein the BIOS writes predefined data to a general purpose input output (GPIO) register, wherein the predefined data controls hardware strapping of the root port to the predefined number of adjacent ports, wherein a first one of the predefined number of adjacent ports is configured to communicate via the N lanes.

9. The system of claim 4, wherein the card is a transmission control protocol (TCP) offload engine (TOE) network interface card (NIC).

* * * * *